(12) United States Patent
Abbott et al.

(10) Patent No.: US 7,356,589 B2
(45) Date of Patent: *Apr. 8, 2008

(54) CONTENT COLLECTION

(75) Inventors: Freeland Abbott, Arlington, MA (US);
Marco Lara, Topsfield, MA (US);
Depankar Neogi, Wilmington, MA (US); Geoff Hardy, Somerville, MA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/197,756

(22) Filed: Aug. 4, 2005

(65) Prior Publication Data

US 2006/0026262 A1    Feb. 2, 2006

Related U.S. Application Data

(63) Continuation of application No. 09/532,483, filed on Dec. 13, 1999, now Pat. No. 7,143,193, and a continuation-in-part of application No. 09/377,611, filed on Aug. 19, 1999, now Pat. No. 6,976,093, and a continuation-in-part of application No. 09/376,017, filed on Aug. 19, 1999, now Pat. No. 7,035,943, and a continuation-in-part of application No. 09/087,263, filed on May 29, 1998, now Pat. No. 6,314,463, and a continuation-in-part of application No. 09/086,874, filed on May 29, 1998, now Pat. No. 6,279,001, and a continuation-in-part of application No. 09/086,836, filed on May 29, 1998, now Pat. No. 6,317,786, and a continuation-in-part of application No. 09/086,821, filed on May 29, 1998.

(60) Provisional application No. 60/117,674, filed on Jan. 28, 1999.

(51) Int. Cl.
*G06F 15/16* (2006.01)

(52) U.S. Cl. ...................... 709/224; 709/227

(58) Field of Classification Search ................ 709/248, 709/226–228, 200–203, 217–225
See application file for complete search history.

(56) References Cited

U.S. PATENT DOCUMENTS 4,750,135 A    6/1988  Boilen
(Continued)

FOREIGN PATENT DOCUMENTS

GB    2 327 783 A    2/1999
(Continued)

OTHER PUBLICATIONS

U.S. Office Action mailed Oct. 11, 2007, for U.S. Appl. No. 11/198,923, filed Aug. 5, 2003, 8 pages.
(Continued)

*Primary Examiner*—Moustafa Meky
(74) *Attorney, Agent, or Firm*—Morrison & Foerster LLP

(57) ABSTRACT

In a web service system with one or more web servers, a system and method for distributing content directly from each web server to a single computer transfers files generated on web servers to a central location for access by a system operator. If files generated by multiple web servers are aggregated on a single computer, processing and analysis can be performed on all of the files. Generally, in one aspect, the invention relates to a system and method for transmitting content from one computer to another in a web service system. The web service system includes web servers that provide web pages in response to web page requests. First and second web server agents provide an interface between the web service system and first and second computers, respectively. The first web server agent runs on the first computer and identifies at least a portion of a file for transmission to the second web server agent running on the second computer in the web service system. At least a portion of the file from the first web server agent is transmitted to the second web server agent and then stored by the second web server agent.

6 Claims, 7 Drawing Sheets

U.S. PATENT DOCUMENTS

| | | |
|---|---|---|
| 5,179,652 A | 1/1993 | Rozmanith et al. |
| 5,223,924 A | 6/1993 | Strubbe |
| 5,294,096 A | 3/1994 | Muller et al. |
| 5,321,803 A | 6/1994 | Ditter, Jr. |
| 5,341,477 A | 8/1994 | Pitkin et al. |
| 5,367,698 A | 11/1994 | Webber et al. |
| 5,418,945 A | 5/1995 | Carter et al. |
| 5,434,994 A | 7/1995 | Shaheen et al. |
| 5,440,739 A | 8/1995 | Beck et al. |
| 5,459,837 A | 10/1995 | Caccavale |
| 5,475,813 A | 12/1995 | Cieslak et al. |
| 5,586,322 A | 12/1996 | Beck et al. |
| 5,611,049 A | 3/1997 | Pitts |
| 5,613,155 A | 3/1997 | Baldiga et al. |
| 5,617,540 A | 4/1997 | Civanlar et al. |
| 5,623,652 A | 4/1997 | Vora et al. |
| 5,630,116 A | 5/1997 | Takaya et al. |
| 5,655,081 A | 8/1997 | Bonnell et al. |
| 5,664,111 A | 9/1997 | Nahan et al. |
| 5,675,784 A | 10/1997 | Maxwell et al. |
| 5,682,525 A | 10/1997 | Bouve et al. |
| 5,689,642 A | 11/1997 | Harkins et al. |
| 5,694,546 A | 12/1997 | Reisman |
| 5,696,963 A | 12/1997 | Ahn |
| 5,708,780 A | 1/1998 | Levergood et al. |
| 5,715,443 A | 2/1998 | Yanagihara et al. |
| 5,715,453 A | 2/1998 | Stewart |
| 5,717,860 A | 2/1998 | Graber et al. |
| 5,724,567 A | 3/1998 | Rose et al. |
| 5,729,735 A | 3/1998 | Meyering et al. |
| 5,742,768 A | 4/1998 | Gennaro et al. |
| 5,758,257 A | 5/1998 | Herz et al. |
| 5,761,507 A | 6/1998 | Govett |
| 5,765,171 A | 6/1998 | Gehani et al. |
| 5,774,660 A | 6/1998 | Brendel et al. |
| 5,774,668 A | 6/1998 | Choquier et al. |
| 5,777,989 A | 7/1998 | McGarvey |
| 5,781,449 A | 7/1998 | Rosborough |
| 5,812,793 A | 9/1998 | Shakib et al. |
| 5,819,284 A | 10/1998 | Farber et al. |
| 5,832,511 A | 11/1998 | Beck et al. |
| 5,848,270 A | 12/1998 | DeLuca et al. |
| 5,862,335 A | 1/1999 | Welch, Jr. et al. |
| 5,867,706 A | 2/1999 | Martin et al. |
| 5,870,559 A | 2/1999 | Leshem et al. |
| 5,881,238 A | 3/1999 | Aman et al. |
| 5,884,002 A | 3/1999 | Cloud et al. |
| 5,884,324 A | 3/1999 | Cheng et al. |
| 5,892,908 A | 4/1999 | Hughes et al. |
| 5,892,914 A | 4/1999 | Pitts |
| 5,894,554 A | 4/1999 | Lowery et al. |
| 5,903,757 A | 5/1999 | Gretz et al. |
| 5,917,491 A | 6/1999 | Bauersfeld |
| 5,923,833 A | 7/1999 | Freund et al. |
| 5,924,096 A | 7/1999 | Draper et al. |
| 5,933,490 A | 8/1999 | White et al. |
| 5,933,596 A | 8/1999 | Mayhew |
| 5,933,606 A | 8/1999 | Mayhew |
| 5,940,594 A | 8/1999 | Ali et al. |
| 5,951,643 A | 9/1999 | Shelton et al. |
| 5,951,694 A | 9/1999 | Choquier et al. |
| 5,954,798 A | 9/1999 | Shelton et al. |
| 5,956,716 A | 9/1999 | Kenner et al. |
| 5,958,008 A | 9/1999 | Pogrebisky et al. |
| 5,958,016 A | 9/1999 | Chang et al. |
| 5,958,088 A | 9/1999 | Vu et al. |
| 5,964,836 A | 10/1999 | Rowe et al. |
| 5,974,441 A | 10/1999 | Rogers et al. |
| 5,974,462 A | 10/1999 | Aman et al. |
| 5,974,572 A | 10/1999 | Weinberg et al. |
| 5,978,802 A | 11/1999 | Hurvig |
| 5,978,805 A | 11/1999 | Carson |
| 5,987,476 A | 11/1999 | Imai et al. |
| 5,987,523 A | 11/1999 | Hind et al. |
| 5,991,798 A | 11/1999 | Ozaki et al. |
| 5,999,930 A | 12/1999 | Wolff |
| 6,003,079 A | 12/1999 | Friedrich et al. |
| 6,006,260 A | 12/1999 | Barrick, Jr. et al. |
| 6,006,264 A | 12/1999 | Colby et al. |
| 6,009,102 A | 12/1999 | Horikawa et al. |
| 6,014,137 A | 1/2000 | Burns |
| 6,014,437 A | 1/2000 | Acker et al. |
| 6,016,496 A | 1/2000 | Roberson |
| 6,016,504 A | 1/2000 | Arnold et al. |
| 6,021,439 A | 2/2000 | Turek et al. |
| 6,023,722 A | 2/2000 | Colyer et al. |
| 6,026,414 A | 2/2000 | Anglin |
| 6,026,452 A | 2/2000 | Pitts |
| 6,029,175 A | 2/2000 | Chow et al. |
| 6,035,323 A | 3/2000 | Narayen et al. |
| 6,035,332 A | 3/2000 | Ingrassia, Jr. et al. |
| 6,037,935 A | 3/2000 | Bates et al. |
| 6,041,041 A | 3/2000 | Ramanathan et al. |
| 6,044,381 A | 3/2000 | Boothby et al. |
| 6,047,309 A | 4/2000 | Dan et al. |
| 6,052,718 A | 4/2000 | Gifford |
| 6,058,426 A | 5/2000 | Godwin et al. |
| 6,061,683 A | 5/2000 | Alonso et al. |
| 6,061,740 A | 5/2000 | Ferguson et al. |
| 6,070,191 A | 5/2000 | Narendran et al. |
| 6,085,234 A | 7/2000 | Pitts et al. |
| 6,088,721 A | 7/2000 | Lin et al. |
| 6,094,659 A | 7/2000 | Bhatia |
| 6,098,093 A | 8/2000 | Bayeh et al. |
| 6,101,508 A | 8/2000 | Wolff |
| 6,105,067 A * | 8/2000 | Batra ........................ 709/227 |
| 6,108,300 A | 8/2000 | Coile et al. |
| 6,112,239 A | 8/2000 | Kenner et al. |
| 6,122,658 A | 9/2000 | Chaddha |
| 6,128,279 A | 10/2000 | O'Neil et al. |
| 6,138,162 A | 10/2000 | Pistriotto et al. |
| 6,148,335 A | 11/2000 | Haggard et al. |
| 6,157,944 A * | 12/2000 | Pedersen .................... 709/204 |
| 6,167,567 A | 12/2000 | Chiles et al. |
| 6,169,794 B1 | 1/2001 | Oshimi et al. |
| 6,173,322 B1 | 1/2001 | Hu |
| 6,182,117 B1 | 1/2001 | Christie et al. |
| 6,182,139 B1 | 1/2001 | Brendel |
| 6,185,601 B1 | 2/2001 | Wolff |
| 6,189,030 B1 | 2/2001 | Kirsch et al. |
| 6,189,043 B1 | 2/2001 | Buyukkoc et al. |
| 6,202,085 B1 | 3/2001 | Benson et al. |
| 6,216,163 B1 | 4/2001 | Bharali et al. |
| 6,223,187 B1 | 4/2001 | Boothby et al. |
| 6,233,187 B1 | 5/2001 | Tsuchiya |
| 6,233,543 B1 | 5/2001 | Butts et al. |
| 6,240,444 B1 | 5/2001 | Fin et al. |
| 6,240,454 B1 | 5/2001 | Nepustil |
| 6,243,715 B1 | 6/2001 | Bogantz et al. |
| 6,243,716 B1 | 6/2001 | Waldo et al. |
| 6,256,675 B1 | 7/2001 | Rabinovich |
| 6,272,593 B1 | 8/2001 | Dujari |
| 6,279,001 B1 | 8/2001 | DeBettencourt et al. |
| 6,286,045 B1 | 9/2001 | Griffiths et al. |
| 6,304,881 B1 | 10/2001 | Halim et al. |
| 6,304,980 B1 | 10/2001 | Beardsley et al. |
| 6,314,463 B1 | 11/2001 | Abbott et al. |
| 6,317,754 B1 | 11/2001 | Peng |
| 6,317,786 B1 | 11/2001 | Yamane et al. |
| 6,321,250 B1 * | 11/2001 | Knape et al. ............... 709/203 |
| 6,330,568 B1 | 12/2001 | Boothby et al. |
| 6,330,602 B1 | 12/2001 | Law et al. |
| 6,339,785 B1 | 1/2002 | Feigenbaum et al. |
| 6,381,242 B1 | 4/2002 | Maher, III et al. |

| | | | |
|---|---|---|---|
| 6,385,626 B1 | 5/2002 | Tamer et al. | |
| 6,405,252 B1 | 6/2002 | Gupta et al. | |
| 6,424,966 B1 | 7/2002 | Meyerzon et al. | |
| 6,446,088 B1 | 9/2002 | Vaduvur et al. | |
| 6,457,063 B1 | 9/2002 | Chintalapati et al. | |
| 6,460,036 B1 | 10/2002 | Herz | |
| 6,460,040 B1 | 10/2002 | Burns | |
| 6,477,522 B1 | 11/2002 | Young | |
| 6,484,204 B1 | 11/2002 | Rabinovich | |
| 6,519,626 B1 | 2/2003 | Soderberg et al. | |
| 6,631,395 B1 | 10/2003 | Chessell et al. | |
| 6,654,891 B1 | 11/2003 | Borsato et al. | |
| 6,678,717 B1 | 1/2004 | Schneider | |
| 6,912,534 B2 | 6/2005 | DeBettencourt et al. | |
| 6,976,093 B2 | 12/2005 | Lara et al. | |
| 7,013,322 B2 | 3/2006 | Lahr | |
| 7,035,943 B2 | 4/2006 | Yamane et al. | |
| 7,143,193 B1* | 11/2006 | Abbott et al. | 709/248 |
| 7,181,523 B2 | 2/2007 | Sim | |
| 2002/0073334 A1* | 6/2002 | Sherman et al. | 713/201 |
| 2006/0031188 A1 | 2/2006 | Lara et al. | |

FOREIGN PATENT DOCUMENTS

| | | |
|---|---|---|
| GB | 2 363 494 B | 12/2001 |
| GB | 2 374 699 B | 10/2002 |
| JP | 10-224349 A | 8/1998 |
| JP | 11-238036 A | 8/1999 |
| JP | 11-327964 A | 11/1999 |
| JP | 2003-516586 A | 5/2003 |
| KR | 10-0729288 B1 | 1/2002 |
| WO | WO-98/54631 A2 | 12/1998 |
| WO | WO-00/45303 A1 | 8/2000 |

OTHER PUBLICATIONS

"Intranet Load-Balancing Solutions," *Infoworld*, Mar. 23, 1998, vol. 20, Issue 12, <http://www.infoworld/cgi-bin/displayArchive/pl?/98/12/intrsola.dat.htm>, printed on Aug. 4, 1998, 28 pages.
Aldrich, S. "Atreve Delivers Web Application Service Level Management," Internet Tools and Technologies Service-e-Bulletin, Nov. 3, 1997, 4 pgs.
Atreve Software, Inc. "Atreve WebSpective and Cisco Local Director," May 1998, 10 pgs.
Atreve Software, Inc. "Insuring Your Web Business for Online Success," Aug. 3, 1998, 2 pgs.
Atreve Software, Inc. "Interceptor 1.0 Installation and User's Guide," Jul. 16, 1997, 36 pgs.
Atreve Software, Inc. "Managing a Successful Financial-Services Web Presence," Apr. 29, 1998, 2 pgs.
Atreve Software, Inc. "Mission Control for Web Operations: A White Paper," Apr. 15, 1998, 18, pgs.
Atreve Software, Inc. "The Case for Web Application Management," Mar. 9, 1998, 2 pgs.
Atreve Software, Inc. "The Case for Web Operations Management," Aug. 3, 1998, 2 pgs.
Atreve Software, Inc. "The WebSpective Content Distributor." Jun. 1998, 9 pgs.
Atreve Software, Inc. "Web Application Management: Quality of Service is Job One," Jun. 24, 1997, 11 pgs.
Atreve Software, Inc. "WebSpective LA Installation and User's Guide," Jul. 16, 1997, 72 pgs.
Atreve Software, Inc. "WEBSPECTIVETM Release 2," Aug. 3, 1998, 2 pgs.
Babcock, C. "Atreve Eases Web App Management," Inter@ctive Week Online, Jun. 15, 1998, 2 pgs.
Bank Technology News, "Wall Street Highlights Problem Of Web Jams," Faulkner & Gray, Inc., Dec. 1997, 2 pgs.
Barnes, M. "e-Commerce Ready to Explode," Boston Soft-ware Newspaper, Jan. 1998, 2 pgs.
Beckett D., "Combined Log System," *Computer Networks and ISDN Systems, North Holland Publishing*, vol. 27, No. 11, Apr. 1, 1995, pp. 1089-1096.
BMC Software, Inc., <http://www.bmc.com/>, printed on Jul. 31, 1998, 28 pages.
Bright Tiger Technologies, <http://www.brighttiger.com/Default.html>, printed on Jul. 30, 1998, 63 pages.
Clark, T. "Atreve updates Site management," CNET NEWS.COM, Jun. 3, 1998, 1pg.
Computerworld, "Atreve Software Has Introduced WebSpective Release 2," Jun. 15, 1998, 1 pg.
Computerworld, "News Products," Computerworld, Dec. 8, 1997, 1 pg.
Computerworld, "the buzz," pp. 6-9, Jul. 27, 1998, <http://www.computerworld>.com/home/emmerce.nsf/all/98072buzz.
Cox, J. "Atreve relieves taxed Web sites," Network Worlds, Jun. 23, 1997, 2 pgs.
Degnan, C. "Atreve shakes out the cobwebs," Mass. High Tech, Nov. 7-13, 1997, 1pg.
Delmonico, D. "Web-Site Management Tools: Big Market With Room For Growth," Internet Week, Feb. 23, 1998, 4 pgs.
Desmond, P. "Atreve to beef up Web management tool," Network World. Fusion, May 29, 1998, 2pgs.
Dias, D. et al., 1996, "A Scalable and Highly Available Web Server," *Digest of Papers of the Computer society Conference Compcon. IEEE Comp. Soc. Press*, vol. CONF>41 , Los Alamitos, US, pp. 85-92.
Eddy, A. "Atreve software to lighten Web management load," Network World, Nov. 24, 1997, 2 pgs.
Freeman, E. "New tools help server farms blossom," Datamation, Feb. 1998, 5 pgs.
Hannon, B. "Atreve Puts New WebSpective On Online Site Management," PC Week, Jun. 8, 1998, 1pg.
Husum, D. "Building on Experience: Atreve Positions Web Management Suite to Interrupt Final Stage of Site Demise," Web Vantage Online, Jun. 5, 1998, 2 pgs.
Infoworld Electric Online, "Intranets & I-Commerce," Jun. 8, 1998, 1 pg.
Infoworld, "Shipping," Jun. 8, 1998, 1pg.
Internet News.Com Online, "Atreve Delivers WebSpective Release 2," Jun. 10, 1998, 1pg.
Internet World Online, "Atreve Upgrades WebSpective System," Jun. 10, 1998, 1pg.
Internet World Products and Services, "Atreve Upgrades WebSpective System," Jun. 8, 1998, 1 pg.
Joachim, D. "Atreve's Web Management Tool Keeps Tabs on User Experience." CMP.NET Online, Jun. 5, 1998, 2 pgs.
Joachim, D. "Web Mgm't Tool Keeps Tabs On User Experience," Internet Week Online, Jun. 8, 1998, 1 pg.
Karpinski, R. "Net Marketing: Web Impact: New Load Balancers Can Help Your Site Serve More Customers," Business Marketing, Jan. 1, 1998, 2 pgs.
Kerstetter et al. "Raising Web Analysis Bar," PC Week Online, Jun. 27, 1997, 2 pgs.
Kerstetter et al. "Raising Web Analysis Bar," PC Week, Jun. 30, 1997, 2 pgs.
Lamm S.E. et al.: "Real-Time Geographic Visualization of World Wide Web Traffic," *Computer Networks and ISDN Systems, North Holland Publishing*, vol. 28, No. 11, May 1, 1996, pp. 1457-1468.
LAN Times, "A certain level of service," LAN Times Online, Jul. 21, 1997, 1 pg.
LAN Times, "Inspecting Internet applications," LAN Times, Dec. 8, 1997, 1 pg.
Mason, R. "Atreve Announces WebSpective: The First Tool for Web Operations Management," Ineternational Data Corporation, 16 pgs., 1998.
Network Magazine, "Web-Spective 1.5 Manages Web Server Loads," Network Magazine, Jan. 12, 1998, 1pgs.
New Product News Onlins, "Atreve Introduces The Only Complete Solution For Web Operations Management," Jun. 8, 1998, 2 pgs.
Patent Cooperation Treaty, International Search Report, International Application No. PCT/US00/01837 mailed on May 29, 2000, 7 pages.
Patent Cooperation Treaty, International Search Report, International Application No. PCT/US00/01897 mailed on May 29, 2000, 7 pages.

Patent Cooperation Treaty, Notification of Transmittal of the International Search Report or the Declaration, International Application No. PCT/US00/42745 mailed on Oct. 23, 2001, 8 pages.
Patent Cooperation Treaty, Written Opinion, International Application No. PCT/US00/01897 mailed on Oct. 25, 2000, 8 pages.
Patent Cooperation Treaty, Written Opinion, International Application No. PCT/US/00/01837 mailed on Oct. 30, 2000, 8 pages.
Patent Cooperation Treaty, Written Opinion, International Application No. PCT/US00/01837 mailed on Oct. 23, 2001, 9 pages.
Patrol Architecture -Raising the Application Standard, <http://www.bmc.com/products/pat/amo/patwphtml>, printed on Jul. 27, 1998, 21 pages.
Petersen, S. "WebSpective Tightens The Reins on Web Apps," PC Week, Nov. 10, 1997, 1 pg.
Petersen, S. "WebSpective Tightens The Reins on Web Apps," PC Week Online, Nov. 10, 1997, 1 pg.
Press Release "Atreve Delivers WESPECTIVE™ 1.5, the Leading Solution for Managing Business-Critical Web Applications," Nov. 10, 1997, 3 pgs.
Press Release "Atreve Introduces the Only Complete Solution for Web Operations Management-Webspective Release 2," Jun. 8, 1998, 3 pgs.
Press Release "Atreve Software Incorporates RSA Encryption for SSL-Secure Web Application Solution," Mar. 17, 1998, 2 pgs.
Press Release "Atreve Software Secures $8.6 Million in Second Round of Venture Financing," Jun. 29, 1998, 3 pgs.
Press Release "Atreve Software, Inc. Formed to Address Challenges Associated with Managing Business-Critical Web Applications," Jun. 23, 1997, 3 pgs.
Press Release "Atreve Software, Inc. Names Glenn D. House President and CEO," Sep. 29, 1997, 3 pgs.
Press Release "Atreve Software, Inc. Names Joe Debold Vice President of Sale," Jan. 6, 1998, 2 pgs.
Press Release "Atreve's WEBSPECTIVE™ 1.5 Increases Performance and Availability of Commerce-Critical Web Sites," Apr. 27, 1998, 3 pgs.
Press Release "Comprehensive Content Replication and Distribution Module Added to Atreve's Webspective Solution," Jun. 8, 1998, 3 pgs.
Press Release, "Atreve Software Names Doherty CFO," Apr. 13, 1998, 2 pgs.
Resonate, Inc., <http://www.resonate.com/>, printed on Jul. 30, 1998, 31 pages.
Rodriguez, K. "Atreve Provides Multiserver Web Management," Inter@ctive Week, Jul. 21, 1997, 1 pg.
Wallace et al. "Load balancers aid Web site access," Computerworld, Dec. 1, 1997, 2 pgs.
Wilder, C. "Atreve Beta Manages Web Apps-WebSpective aimed at high-volume sites," Information Week, Jun. 23, 1997, 1 pg.
Wilder, C. "Atreve Beta Manages Web Apps-WebSpective aimed a high-volume sites," Information Week Online, Jun. 23, 1997, 1 pg.
Wilson, R. "Atreve Sees New Perspective," Internet Week, Nov. 24, 1997, 1 pg.
Wilson, T. "Managing Access To E-Commerce Sites," Internet Week, Sep. 1, 1997, 3 pgs.
Wilson, T. "Scrutinizing Web Performance Increased Internet-Traffic Problematic When There's No Time to Plan," Internet Week Online, Nov. 17, 1997, 2 pgs.
Wilson, T. "Wall Street Frenzy Leaves Website Managers; Taking Stock," Internet Week Online, Nov. 13, 1997, 2 pgs.

* cited by examiner

CONTENT COLLECTION

CROSS-REFERENCE TO RELATED APPLICATIONS

This application is a continuation of U.S. application Ser. No. 09/532,483 filed Dec. 13, 1999, now U.S. Pat. No. 7,143,193 and is a continuation-in-part of each of the following Non-Provisional U.S. patent applications: Ser. No. 09/086,821, filed May 29, 1998; Ser. No. 09/086,836, filed May 29, 1998 now U.S. Pat. No 6,317,786; Ser. No. 09/086,874, filed May 29, 1998 now U.S. Pat. No 6,279,001; Ser. No. 09/087,263, filed May 29, 1998 now U.S. Pat. No. 6,314,463; Ser. No. 09/376,017, filed Aug. 19, 1999 now U.S. Pat. No. 7,035,943; and Ser. No. 09/377,611, filed Aug. 19, 1999, now U.S. Pat. No. 6,976,093 and claims priority to and the benefit of Provisional U.S. patent application Ser. No. 60/117,674, filed Jan. 28, 1999. The entirety of each of these related applications is incorporated herein by reference.

TECHNICAL FIELD

This invention relates to managing multiple web servers, and more particularly to a web service system that allows a system operator to collect content from each web server to a single computer in the web service system.

BACKGROUND INFORMATION

In a computer network environment, web servers are used to respond to users' web page requests, which are transmitted over the computer network. Web page requests, also referred to as content requests, typically are made by a browser running on a user's computer. A web server monitors one or more computer network address/port endpoints for web page requests and responds to the web page requests by transmitting web pages to the requester. Web servers may be special purpose devices, or they may be implemented with a software program running on a general purpose computer. The service capacity of a web server limits the number of web page requests that may be received and responded to in a given time interval.

A web service system may include one web server or more than one web server. Generally, when a web service system includes more than one web server, the web service system is designed so that the multiple web servers each respond to web page requests. Typically, a user's web page request is directed towards one of the web servers, and that web server responds to that web page request. It is also typical for web service systems designed to receive a large number of web page requests to include many web servers.

In general, in a system with multiple web servers, a system operator or operators manage the content offered by the various web servers. A system operator may sometimes wish to access the data that has been generated and stored on each web server. For example, a system operator may want to access the web server log files generated by each web server. This can be difficult and time-consuming, because it can be awkward to gather and access files located on different computers.

SUMMARY OF THE INVENTION

In a web service system with one or many web servers, a system and method for distributing content directly from each web server to a single computer is useful to a system operator. For example, it is often desirable to transfer files generated on web servers to a central location for access by a system operator. If files generated by multiple web servers are aggregated on a single computer, processing and analysis can be performed more easily on all of the files.

Generally, in one aspect, the invention relates to a system and method for transmitting content from one computer to another in a web service system. The web service system includes web servers which provide web pages in response to web page requests. First and second web server agents provide an interface between the web service system and first and second computers, respectively. The first web server agent runs on the first computer and identifies at least a portion of a file for transmission to the second web server agent running on the second computer. At least a portion of the file from the first web server agent is transmitted to the second web server agent and then stored by the second web server agent.

In one embodiment, the file is identified, transmitted, and stored in its entirety. In another embodiment, the file is identified, transmitted, and stored repeatedly. In yet another embodiment, the method includes identifying a portion of the file that was not previously transmitted. In still another embodiment, the method includes identifying a portion of the file that contains content added subsequent to any previous identification. In another embodiment, the method also includes executing a computer program that operates on the file. In another embodiment, the file to be transmitted is a log file containing information about user requests to the on or more web servers in the web service system.

In general, in another aspect, the invention relates to a method for transmitting content from one computer to another in a web service system. A first web server agent running on a first computer in the web service system determines that a first file with a first name was renamed to a second name such that the first file has the second name and a second file has the first name. The first file having the second name is then identified. A second web server agent runs on a second computer and is notified that the first file was renamed. At least a portion of the first file is transmitted from the first web server agent to the second web server agent. The second file having the first name is identified and a portion of the second file is transmitted from the first web server agent to the second web server agent.

In general, in yet another aspect, the invention relates to a method for transmitting content from one computer to another in a web service system. The web service system provides web pages in response to web page requests. A first web server agent provides an interface between the web service system and a first computer. The first web server agent runs on the first computer, and identifies and runs a computer program. The output of the computer program is then transmitted from the first web server agent to a second web server agent running on a second computer, and the output is then stored by the second web server agent.

In general, in still another aspect, the invention relates to a method for transmitting content from one computer to another in a web service system. A first web server agent provides an interface between the web service system and a first computer. The first web server agent runs on the first computer and identifies at least a portion of a file for transmission to a second web server agent running on a second computer. The identified portion of the file is transmitted from the first web server agent to the second web server agent. The second web server agent provides the received portion of transmitted file as input to a computer program.

In general, in still another aspect, the invention relates to a method for transmitting content from one computer to another in a web service system. A first web server agent provides an interface between the web service system and the first computer. The first web server agent runs on a first computer and identifies and runs a computer program. The output of the computer program is then transmitted from the first web server agent to a second web server agent running on a second computer. The second web server agent provides the received portion of transmitted file as input to a computer program.

In general, in still another aspect, the invention relates to a method for transmitting content from one computer to another in a web service system. A first web server agent runs on a first computer and provides an interface between the web service system and the first computer. The first web server agent identifies at least a portion of a file for transmission to a second web server agent running on a second computer. The first computer transmits at least the portion of the file from the first web server agent to the second web server agent. The second computer includes a storage medium for storing, by the second web server agent, at least the portion of the transmitted file.

In general, in still another aspect, the invention relates to a computer program embodied on a computer-readable medium. The computer program includes an identification code segment for identifying, by a first web server agent running on a first computer in a web service system, at least a portion of a file for transmission to a second web server agent running on a second computer. The web service system includes web servers that provide web pages in response to web page requests. The first and second web server agents each provide an interface between the web service system and the first and second computers, respectively. The computer program also includes a transmitting code segment for transmitting at least the portion of the file from the first web server agent to the second web server agent.

The foregoing and other objects, aspects, features, and advantages of the invention will become more apparent from the following description.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

A system for serving web pages has a plurality of web servers and provides a system operator with features and tools to coordinate the operation of multiple web servers. The system might have only one web server, but typically it includes more than one. The system can manage traffic by directing web page requests, which originate, generally, from web browsers on client computers, to available web servers, thus balancing the web page request service load among the multiple servers. The system can collect data on web page requests and web server responses to those web page requests, and provides reporting of the data as well as automatic and manual analysis tools. The system can monitor for specific events, and can act automatically upon the occurrence of such events. The events include predictions or thresholds that indicate impending system problems. The system can include crisis management capability to provide automatic error recovery, and to guide a system operator through the possible actions that can be taken to recover from events such as component failure or network environment problems. The system can present current information about the system operation to a system operator. The system can manage content replication with version control and data updates. Some or all of this functionality can be provided in specific embodiments.

Figure 1:
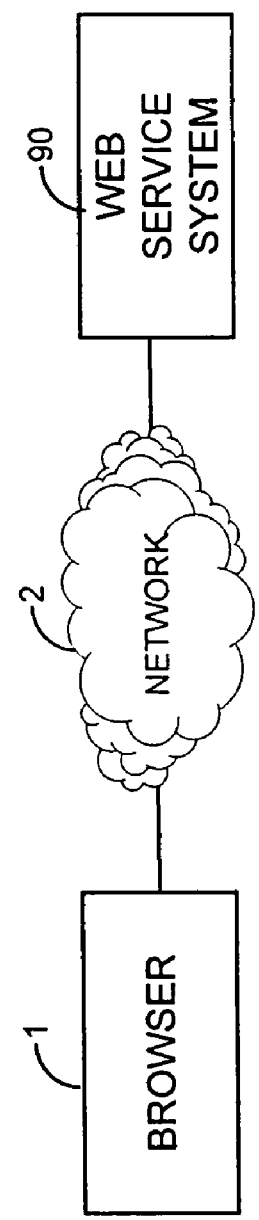
FIG. 1 is a block diagram of an embodiment of a web service system according to the invention.

Referring to FIG. 1, an embodiment of a web service system 90 receives web page requests from a browser 1. In this context, a web page is electronic content that can be made available on a computer network 2 in response to a request. An example of a web page is a data file that includes computer executable or interpretable information, graphics, sound, text, and/or video, that can be displayed, executed, played, processed, streamed, and/or stored and that can contain links, or pointers, to other web pages. Requests typically originate from web browsers 1 and are communicated across a communications network 2. In one embodiment, the communications network 2 is an intranet. In another embodiment, the communications network 2 is the global communications network known as the Internet. A browser 1 can be operated by users to make web page requests. Browsers 1 can also be operated by a computer or computer program, and make requests automatically based on the computer's programming. The web page requests can be made using hypertext transfer protocol ("http") format, and also can be made using other protocols that provide request capability.

Figure 2:
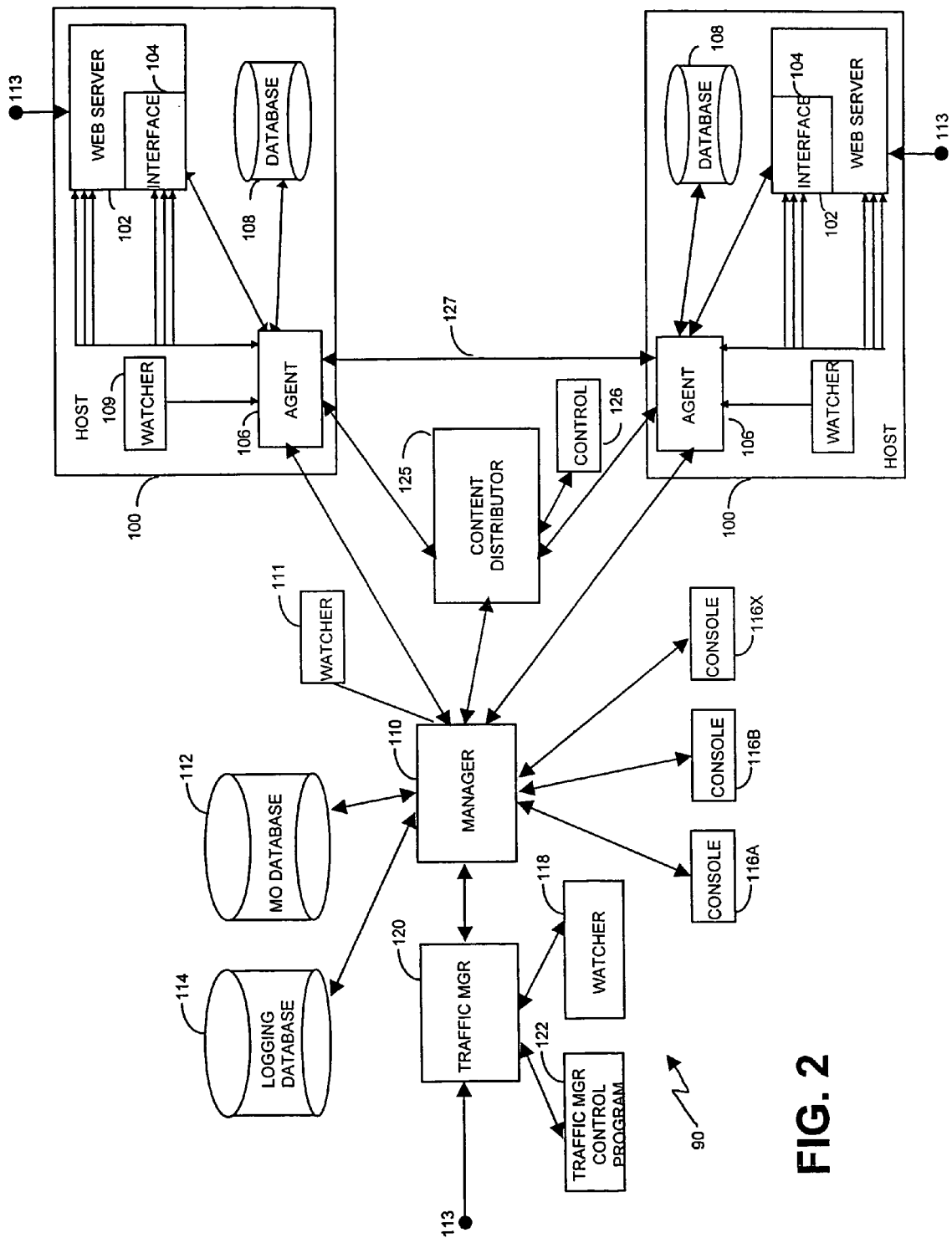
FIG. 2 is more detailed block diagram of an embodiment of a web service system.

Referring to FIG. 2, an embodiment of a web service system 90, includes various components 100-126. The components communicate over one or more computer networks. The physical location of the components does not impact the capability or the performance of the system, as long as the communications links between the various components have sufficient data communication capability. The web service system 90 can function across firewalls of various designs, and can be configured and administered remotely.

The web service system 90 manages one or more hosts 100. Two hosts 100 are shown as an example. An embodiment of the web service system 90 can have any number of hosts 100. Each host 100 can be a computer system commercially available and capable of using a multi-threaded operating system such as UNIX or WINDOWS NT™. Each host 100 can have at least one network connection to a computer network, for example the Internet or an intranet, or any other network, that allows the host 100 to provide web pages in response to web page requests. Each host 100 includes at least one web server 102.

The web server 102 can be any web server that serves web pages in response to web page requests received over a computer network. Two examples of such web servers are commercially available as the NETSCAPE ENTERPRISE SERVER, available from Netscape Communications Corporation of Mountain View, Calif. and the MICROSOFT INTERNET INFORMATION SERVICES SERVER, available from Microsoft Corporation of Redmond, Wash. The web server 102 is capable of receiving web page requests 113 from web clients, also referred to as browsers and/or web page requesters. A web page request 113 from a browser is also referred to as a content request, or from the point of view of a web server, as a "hit." Often the web page requests are part of a series of communications with the web server 102 involving several requests and responses. One such series, referred to as a session, is an extended interaction with the web server. A shorter interaction, for example the purchase of an item, is referred to as a transaction. A session could involve several transactions. The user interacts with a web server 102 by making an initial request 113 of the web server 102, which results in the web server 102 sending a web page in response. The web page can contain information, and also, or alternatively, pointers to other requests that the user can make of the web server 102 or, perhaps, other web servers. Sometimes the requests are for information that must be retrieved from a database, and sometimes the request includes information to be stored in a database. Sometimes the request requires processing by the web server 102, or interaction with another computer system. Sophisticated web servers and browsers can interact in various ways.

An aggregation of related web pages presented to a user as a set of web pages about a related topic, or from a particular source, usually, but not always from the same web server 102, is referred to as an application. One example of an application is a set of pages providing information about a company. Another example of an application is a series of pages that allow a user to conduct transactions with her savings bank. Two sets of web pages may be considered a single application, or they can be considered two separate applications. For example, a set of web pages might provide information about a bank, and a customer service set of web pages might allow transaction of business with the bank. Whether a set of web pages is considered to be one application or several applications is a decision made by the application designer. The web service system 90 is capable of delivering one or more applications to users. The web service system 90 can be configured so that some subset of the web servers 102 exclusively serve a single application. In one embodiment, some web servers 102 serve a subset of the available applications, and other web servers 102 serve other applications. In another embodiment, all web servers 102 serve all available applications.

The web pages that are presented to the user in response to web page requests 113 from the user's web browser can be stored on the host 100 file system or on another file system accessible to the web server 102. Some or all of the web page content can be generated by the web server 102 by processing data available to the web server 102. For example, for web pages that are documents about a topic, the web pages can be created (designed) and stored in the web server 102 file system. In response to a web page request, such a web page can be sent to the user just as it is stored in the file system. In a banking transaction system, however, it is likely that information about the user's bank account will be stored in a database. The web server 102 can generate a web page containing the user's account information by making database requests each time the user requests the page. Often, web pages are stored partially in the file system, and partly are generated by the web server 102 when the request is made.

Various techniques are used to store status information, also referred to as the "state" of a user's session with the web server 102. The user can develop a state during her interaction with the web server 102 via the requests made to the web server 102 and the web pages received in response to those requests. The user's state can, as one example, include information identifying the user. As another example, the state can include information specifying web pages the user has already requested, or the options the user has selected in her interaction with the system. As another example, the state can include items the user has selected for purchase from a commercial sales application. Generally some information about or identifying the state of the session is stored in the client web browser, for example as a cookie that identifies the user to the web service system 90, and some information can be stored in the web server 102.

Each web server 102 can generate and maintain a log file of all the requests 113 for web pages made to the web server, the web server responses to these requests, as well as of various events occurring during the web server's operation, such as a status of computer programs running on the server, component failures or network environment problems. In addition, each web server 102 is capable of receiving other information from a browser, and storing it on the host 100.

A host 100 can have any number of web servers 102 running on it, depending on host capacity, performance, and cost considerations. In one embodiment, the host 100 includes one web server 102. In other embodiments, a host includes more than one web server 102. The one web server 102 on the host 100 in FIG. 2 is a simplified illustrative example and is not intended to limit the number of possible web servers that could run on a host. Each web server 102 monitors at least one network address and port, also referred to as an endpoint. A particular address and port is called an endpoint because it is a virtual endpoint for communication. A network connection is made between one address/port endpoint and another. The web server 102 receives requests directed to one of its endpoints and responds to those requests with data in the form of web pages.

A web server 102 that accepts requests at multiple network address/port endpoints can perform as if it were a plurality of distinct web servers 102 even though it is actually implemented as one web server 102. Such a web server is referred to as a multiple endpoint web server. For the purposes of this discussion, a multiple endpoint web server can be described as if it were in fact multiple web servers 102 with each web server 102 receiving requests on a network address/port endpoint. In one embodiment, such a multiple endpoint web server has one web server interface 104 that is the interface for all of the multiple endpoints.

Each web server 102 can have associated with it a web server interface 104. The web server interface can be a plug-in, filter, or other software associated with the web server 102 that serves as an interface between the web server 102 and other components of web service system 90. In this context, the term web server interface is distinct from the network interface that can be present on the host 100. For example, the web server 102 has a web server interface 104. Each web server interface 104 on a host 100 can communicate with an agent 106.

Each host 100 includes an agent 106. The agent 106 provides a web service system 90 interface with the host 100, serving as an intermediary between the manager 110 and any other software running on host 100, including the operating system. The agent 106 links the web server interface 104 (if present) with the web service system 90. The agent 106 also links the host 100 with the web service system 90. In one embodiment, the agent 106 is implemented in software using the JAVA programming language. The agent 106 can run in the background. On a UNIX system it can run as a deamon, on WINDOWS NT™ it can run as a service. Even on a host that has multiple web servers, there is generally only one agent 106 running on the host 100, however it is possible to have more than one. Each agent 106 has access to a database 108, which contains information about the system components.

The agent 106 communicates with the one or more web servers 102 on a host 100 via the web server interface 104 associated with each web server 102. The web server interface 104 provides the agent 106 with information about the web page requests received from users, and the pages sent in response to the requests.

In one embodiment, communication from the web server interfaces 104 to the agent 106 takes place over shared memory channel. The agent 106 reserves shared memory, and the web server interfaces 104 are able to write data into the shared memory. This has the advantage of being faster than using sockets, and allows the agent 106 to receive data from all web server interfaces 104 at one buffer. This communication link could also be implemented with sockets or other interprocess communication.

The agent 106 on a host 100 communicates with a web service system manager 110. The manager 110 receives information from the agents 106 about the status of the hosts 100 and the web servers 102. The manager 110 can send commands to the agents 106 to configure the hosts 100, to start, stop, or pause the web servers 102, and to manage the load on the web servers 102. The manager 110 has access to a logging database 114 that is used for logging system activity and events. The manager 110 also has access to a managed object database 112, used for storing information about the various components of the system. The manager 110 is also in communication with one or more consoles 116A-116X, generally referred to as 116. The consoles 116 provide a user interface for the system operator. The system operator can monitor the status of the system and configure the system via a console. The manager 110 can be run on the same host 100 as other web service system 90 components, such as one of the web servers 102 or a traffic manager 120, or on another computer of sufficient capacity.

The agents 106 have the capability to communicate directly with each other, as shown by link 127. In one embodiment, communication takes place over a TCP/IP socket, opened from a first one of the agents 106 to a second agent 106. Messages can be sent on that socket to communicate files and information about files. In one configuration the first agent 106 may not be able to open a socket to the second agent 106, because of a firewall between them. In one such embodiment, the first agent 106 opens a socket to the manager 110. The first agent 106 sends a message, via the manager 110, requesting that the second agent 106 open a socket to the first agent 106. The manager passes on this request to the second agent 106, and the second agent 106 opens a socket to the first agent 106. The first agent 106 can then use this socket to send messages to the second agent.

In one embodiment, the communication protocol allows a first agent 106 to transfer an entire file to the second agent 106. It also allows the first agent 106 to transfer a portion of a file to the second agent 106 to be appended to a file on the second agent. It also allows the first agent 106 to instruct the second agent 106 to rename a file on the second agent. It also allows the first agent 106 to delete a file on the second agent.

In one embodiment, the manager 110 communicates with a traffic manager 120, also referred to as an interceptor. A traffic manager 120 directs web page requests 113 to a web server 102. It is not necessary for a web service system to include a traffic manger 120, or any particular type of traffic manager 120. In one embodiment, the traffic manager 120 receives information and commands from the manager 110. The traffic manager 120 also receives information and commands from a traffic manager control program 122. The traffic manager control program can be on the same computer system as the traffic manager 120, or alternatively it can run on another system. The traffic manager 120 receives web page requests 113 and refers the requests to one of the web servers 102. In one embodiment, the traffic manager 120 sends a message to browser in response to the web page request, referring the browser to one of the web servers 102. The browser then makes the request 113 directly to the web server 102. Alternatively, the traffic manager may pass the request through to the web server 102, and pass the response back to the browser (not shown in the figure).

Part of the management capability of the web service system 90 is accomplished by monitoring the web page requests made of the web servers 102 and the resulting load on the web servers 102 and the hosts 100. Web page requests can be directed to balance the load among the web servers 102. In one embodiment, the traffic manager 120 is the point of first contact for a user. The traffic manager 120 receives a web page request from a user and "refers" the user's web browser to an appropriate web server 102 for that request. The user's web browser is referred by responding to the web page request with a referral to a web page on an appropriate web server 102. This referral capability can be accomplished with a capability incorporated into the hypertext transfer protocol, but can also be accomplished in other ways. The user may or may not be aware that the web browser has been referred to an appropriate web server 102. The user accesses the application on that web server 102 and receives responses to its web page request from that web server 102. In one embodiment, if a web server 102 becomes overloaded, that web server 102, under the direction of the manager 110, can refer the user back to the traffic manager 120 or to another web server 102 capable of delivering the application.

The traffic manager 120 receives requests from users and redirects the user's requests to web servers 102. In one embodiment, the traffic manager 120 is used to direct all users to one web server 102, such as another traffic manager 120 or a single endpoint. In this manner, the traffic manager 120 acts as a shunt, meaning it directs all requests directed towards one or more web servers on a host to another web server 102. In another embodiment, the traffic manager 120 receives status information from the manager 110 and uses that information to redirect users. The status information includes server availability and load, administrator's changes, and application or web server 102 start and shut down actions. The traffic manager 120 is designed for speed and security. The traffic manager 120 is often the front door to the system, and so its performance affects the perceived performance of the entire web service system 90. It may be useful to locate the traffic manager 120 as close, in the network topology sense, to the backbone as possible. It is then necessarily the most exposed component of the web service system 90.

In one embodiment, the traffic manager 120 is implemented in hardware. In another embodiment, the traffic manager 120 is a software program running on a host computer. In one software embodiment, the traffic manager 120 is a standalone program that runs on a server-class computer capable of running a multi-threaded operating system. Under UNIX, for example, the traffic manager 120 can run as a daemon. Under WINDOWS NT™, the traffic manager 120 can run as a service.

In another embodiment, the traffic manager 120 is an internet protocol bridge or router that directs requests made to one endpoint to the endpoint belonging to a web server 102. In this way, the traffic manager 120 directs the web page requests to one or more web servers 102. An example of such a traffic manager is the LOCALDIRECTOR available from Cisco Systems, Inc. of San Jose, Calif. In yet another embodiment, the traffic manager 120 is a web switch, such as a CONTENT SMART WEB SWITCH available from Arrowpoint Communications, Inc. of Westford, Mass. The traffic manager 120 receives each web page request and, based on the request, directs the request to a web server.

In one embodiment, the web service system 90 also includes a version controller, also referred to as a content distributor 125. In this context, a content distributor 125 manages version and content replication, and may provide content updates for the various web servers 102 in the web service system 90. A system operator interface to the content distributor 125 is provided by a content control 126. In one embodiment, the content distributor 125 and the content control 126 are each a stand-alone process that operates on the host 100. In another embodiment, the content distributor 125 and the content control 126 operate on the same host as the manager 110. In still other embodiments, content distributor 125 and the content control 126 operate on other hosts. The content distributor 125 and the content control 126 can operate on the same host, or on a different host. In other embodiments, the content distributor 125 is incorporated into the functionality of the manager 110, or other components of the system 90.

Figure 3:
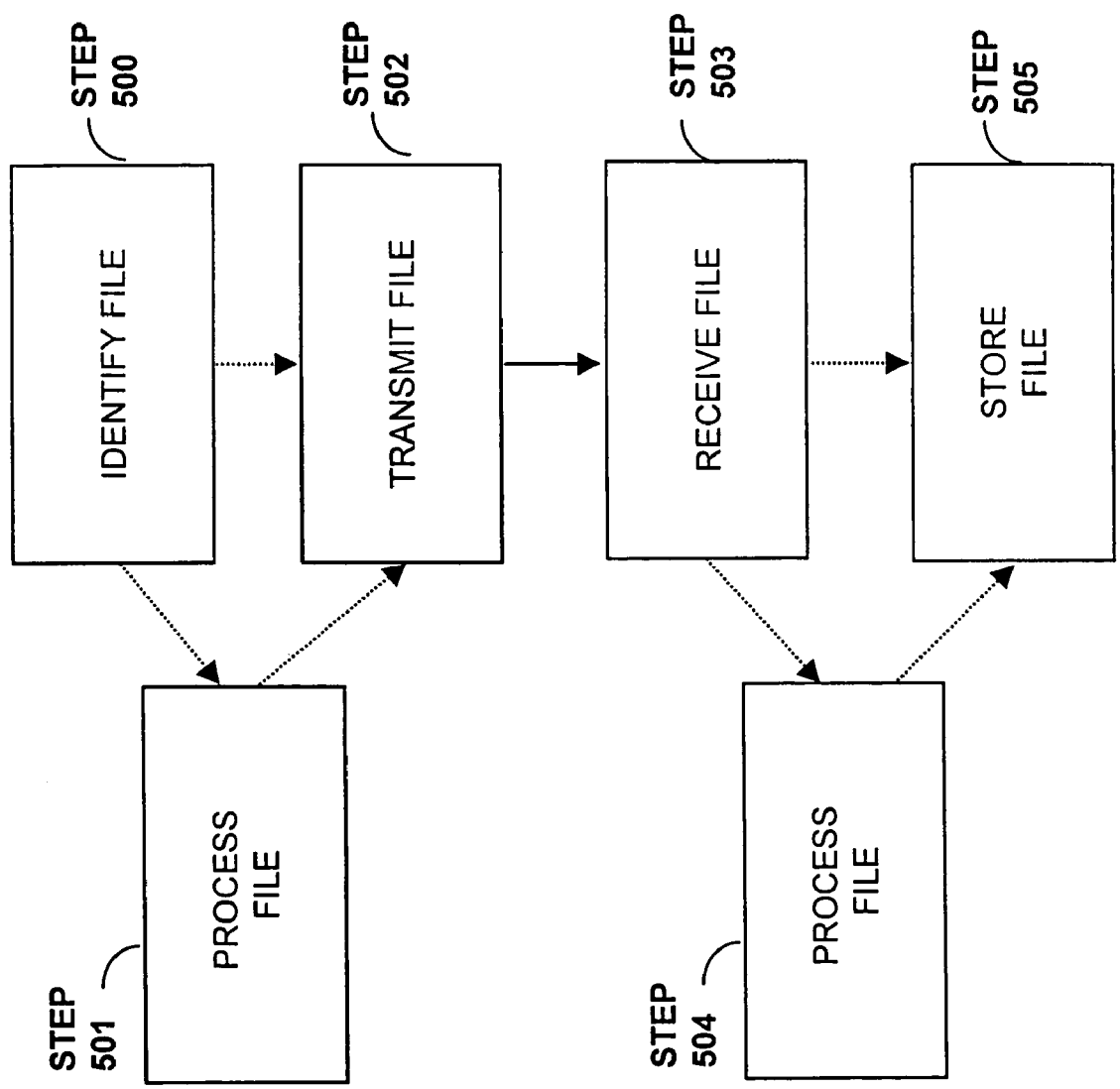
FIG. 3 is a flowchart of file transfer according to an embodiment of the invention.

Referring to FIG. 3, in an embodiment of the web service system just described, a file is identified on a web server 102 (STEP 500) by an agent 106, referred to as the transmitting agent. The file can be any type of file, and contain any type of content. A file can be identified in various ways. A file can be identified manually by the system operator, for example by identifying the file system path and file name. A file can be identified by a computer, for example by matching a set of predefined attributes to all files (or a set of files) until a match is found. The file that matches the predefined attributes is then identified. The file may be the output from a predefined application program, system utility, JAVA class, or other process. In one embodiment, the identified file is the output from such a computer program which is streamed directly to the agent.

Optionally, the identified file may be processed (STEP 501). The identified file may be provided as input to an application program, operating system utility, JAVA class, or other process, for processing. The processing may modify the format of the file, compress the file, substitute addresses in one format for another (e.g. resolve IP addresses into DNS names), or otherwise prepare the file for transmission, or extract information from the file.

In one embodiment, the agent is implemented in JAVA, and the identification, processing, and transmission functions are implemented as JAVA methods. A system operator can provide a JAVA class other than the default to implement additional functions. If the system operator provides a JAVA class other than the default, that JAVA class is used. This allows the agent to, for example, use the output from a process instead of an input file, perform various types of processing, or use a particular communications protocol for transmission.

Either with or without processing, the file is transmitted to a receiving computer (STEP 502). The receiving computer can be one of the hosts 100, the content distributor 125, or another computer in the web service system 90. The receiving computer could be selected by a system operator before a particular file transmission, or the same receiving computer can be used for all transmissions. In one embodiment, transmission is accomplished using the agent-agent protocol described above. In other embodiments, file transmission can be accomplished with various other protocols.

The file is received by an agent, referred to as a receiving agent, which is running on the receiving computer (STEP 503). Optionally, the file is processed by the receiving computer (STEP 504). For example, the received file may be provided as input to an application program, operating system utility, JAVA class, or other process. The processing can include converting the transmitted file into a different file format, uncompressing the file, and so on. The processing can include incorporating the data from the transmitted file into a database. The processing can include incorporating the data from the transmitted file into a file that includes data from files from more than one host.

Either with or without processing, whichever is the case, the received file is stored by the receiving computer (STEP 505). The file can be stored in the receiving computer's file system with the same name as the file had on the transmitting computer's file system. The file can also be stored with a different name, for example with a file name that includes the name of the transmitting computer. In another embodiment, the file storage is accomplished by providing the file as the input to an application program, system utility, JAVA class, or other process.

In one embodiment, the agent is implemented in JAVA, and the receiving, processing, and storage functions are implemented as JAVA methods. A system operator can provide a JAVA class other than the default to implement additional functions. If the system operator provides a JAVA class other than the default, that JAVA class is used. This allows the agent to, for example, use a particular protocol for communication, perform various types of processing, or provide output to a process instead of a file.

In one embodiment, a system operator configures a "job," which is a one-time or repeating transfer that takes place at a particular time or time interval. The specification of a job includes: the job name, which is an identifier assigned by the system operator for easy recognition of the job; the source host, which is the name of the host on which the transmitting agent is operating; the source filename, which is the file system path and file name; a transmitting computer program identifier, which is (in one embodiment) a JAVA class that is either the default or a class provided by the system operator; a schedule, which may be a time or time interval, or require manual initiation; attributes, including whether the source file is continuously updated and whether it is a rotated file (as described with reference to FIG. 4 and FIG. 5), and, for example, whether the file should be compressed before it is transmitted; the destination host, which is the host on which the receiving agent is running; the destination file name, which is the file system path and file name; and a receiving computer program identifier, which is a JAVA class that is either the default or a class provided by the system operator.

When an agent 106 is started, it scans all pending jobs, determining which files on the web server 102 need to be transmitted according to the defined schedules. At the appropriate time, the agent 106 attempts to connect an agent on the receiving host. Once the connection to the receiving agent is initiated, the file may be processed by the source agent (e.g. compressed if the job is configured for compression), transmitted to the receiving agent, processed by the receiving agent (e.g. uncompressed if so configured), and installed into the destination location. In another embodiment, after being transmitted to a receiving agent and uncompressed, the file is fed into a computer program for processing, and the result is then stored on the receiving computer.

Figure 4:
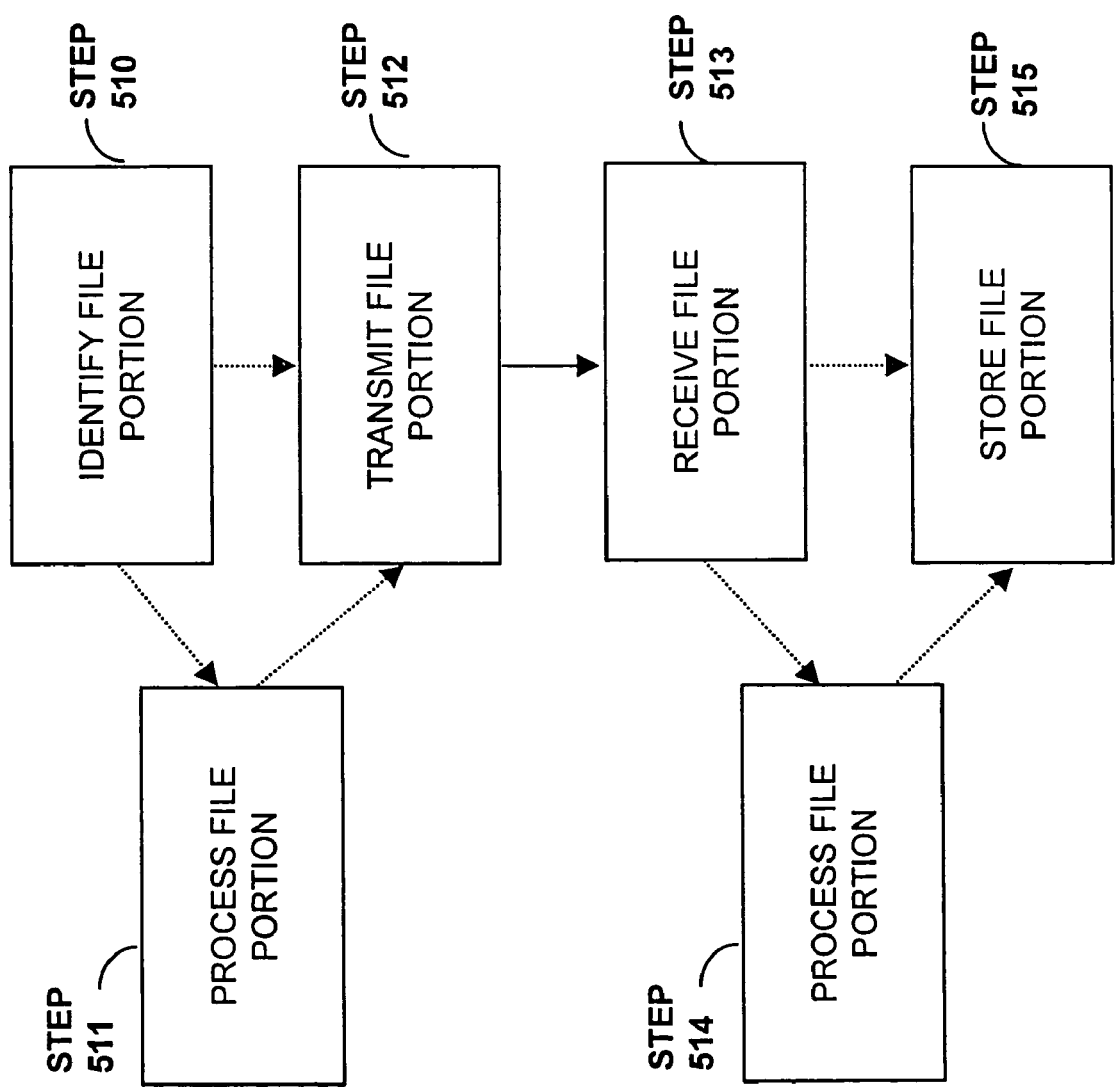
FIG. 4 is a flowchart of file portion transfer according to another embodiment of the invention.

Referring to FIG. 4, some files may be continuously updated as time passes. An example of a file that is continuously updated is a log file, which is a running record of events and/or status reported by a computer program such as a web server or operating system. Often, such files are updated as events occur, periodically to record status, or both. Often, such a file is updated by an application that makes changes to a file by appending some event or status information to the end of a file.

In one embodiment, if the job attributes indicate that the file is continuously updated, the system can take appropriate action. For example, the portion of the file (if any) that has not been previously transmitted is identified (STEP 510). If no changes have been made, no further action is taken. This determination can be accomplished by storing the length of a file that was previously transmitted, and identifying any appended portion (i.e. changes) included in the file since the previous transmission. After the changes to the file are identified in STEP 510, optionally, the changes are processed (STEP 511) as described above with regard to STEP 501 of FIG. 3, and transmitted (STEP 512) to a receiving computer. Optionally, the receiving computer processes the received data (STEP 513) in the manner described above with regard to STEP 504 of FIG. 3. For example the file changes can be processed for inclusion in the file (for example decompressed) or processed for inclusion in a database or other aggregation of data. Either after or without processing of STEP 514, the changes are stored (STEP 515). In one embodiment, the changes are made to the copy of the changed file that is located on the receiving computer. In another embodiment, the changes are stored in a separate file. In another embodiment the changes are provided to a computer program, as described above.

Figure 5:
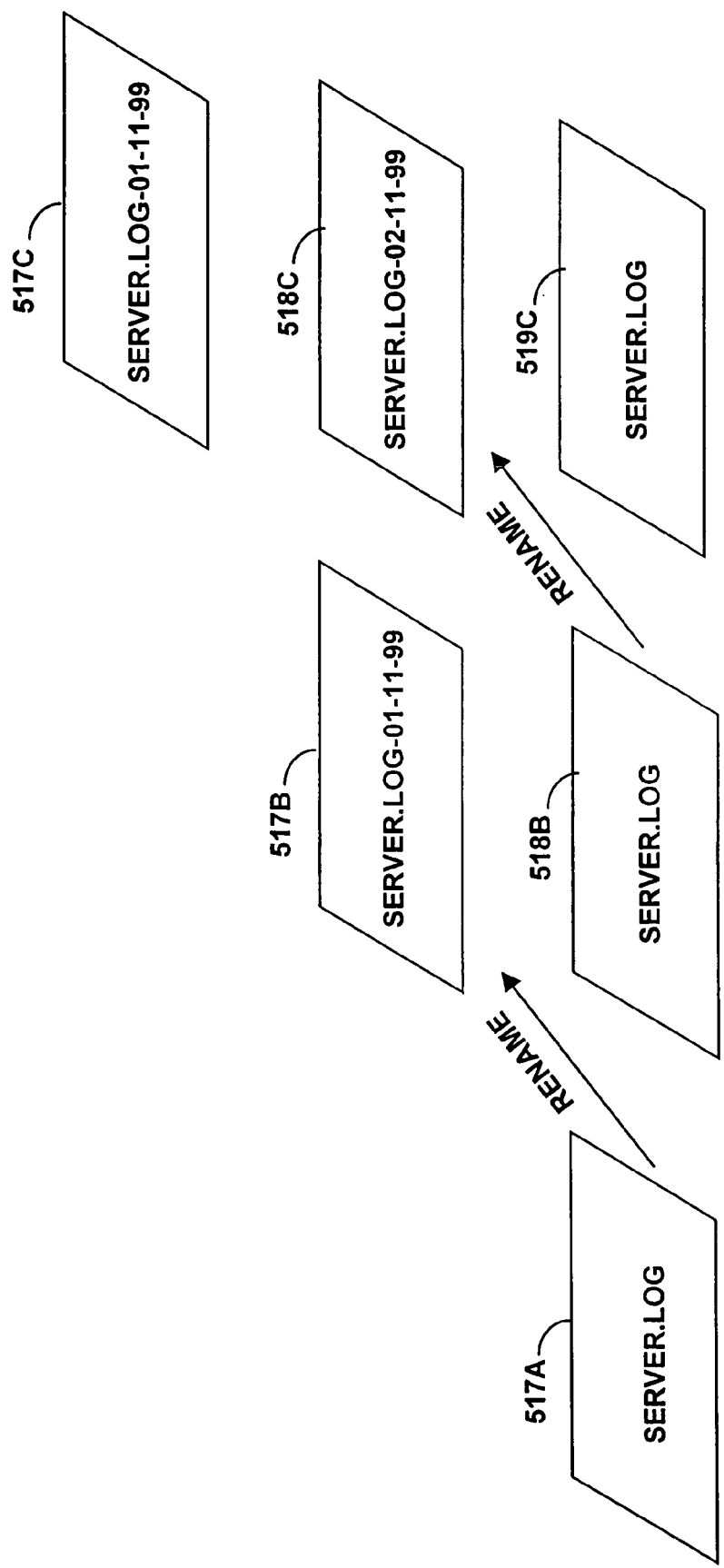
FIG. 5 depicts file rotation.

Referring to FIG. 5, in some systems, a web server or other application will "rotate" or rename files that are continuously updated. For example, a file that is continuously updated may be renamed from its first, original name to a second name. A new file is given the original name and this new file is updated from that time forward. In other words, the renamed file becomes an archive, and the new file receives the continuous updates. This technique often is used for log files, because it prevents the files from growing infinitely long, and makes it possible to identify the file in which particular data might be located.

For example, still referring to FIG. 5, a web server log file called "SERVER.LOG" 517A is periodically renamed with a name that includes the date every day at noon. When the file is renamed, a new file with the original name "SERVER.LOG" 518B, 519C is created. Thus, in this example, on Nov. 1, 1999, the "SERVER.LOG" file 517A is renamed to "SERVER.LOG-01-11-99" 517B to indicate that the log was renamed on Nov. 1, 1999. A new "SERVER.LOG" file 518B is created at that time. This new "SERVER.LOG" file 518B receives the continuous updates from noon on Nov. 1, 1999 until 11:50 am on Nov. 2, 1999. At noon on Nov. 2, 1999, the "SERVER.LOG" file 518B created on Nov. 1, 1999, and which now contains the changes since noon on Nov. 1, 1999, is renamed to "SERVER.LOG-02-11-99" 518C. A new, empty "SERVER.LOG" file 519C is created at that time. This new "SERVER.LOG" file 519C is updated for the next twenty-four hours, and so on. The log file rotation may take place at any regular time interval, such as a number of days, weeks, months or years, or may take place when a file reaches a certain size.

Figure 6:
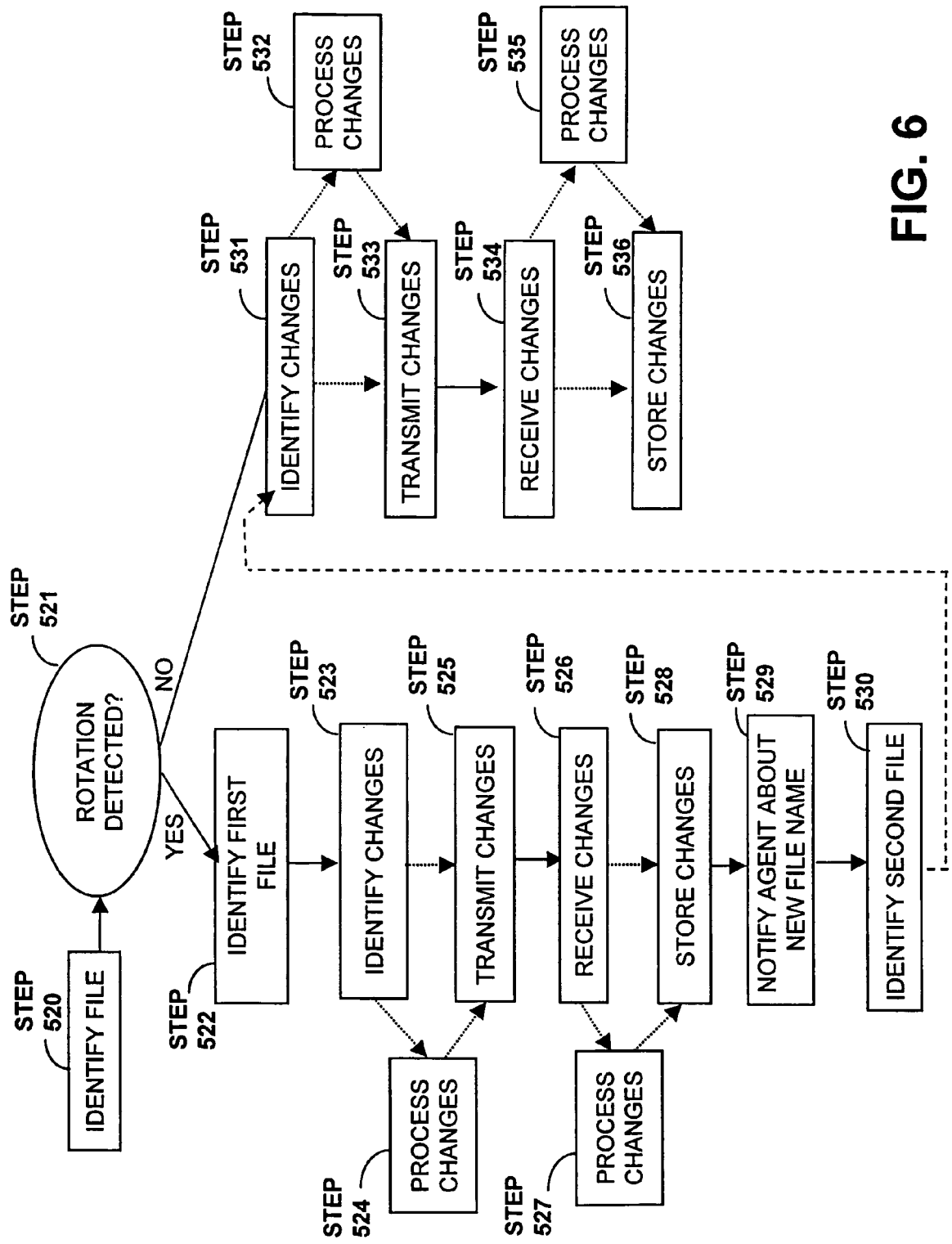
FIG. 6 is a flow chart of file transfer which detects file rotation (FIG. 5) according to an embodiment of the invention.

Referring to FIG. 6, in one embodiment, if the job attribute indicates that a file may be rotated, an agent determines that rotation occurred, and transfers the file data accordingly. Changes from the rotated file that were not previously transmitted are transmitted, and changes from the new file are transmitted as well.

First, the file is identified (STEP 520) as before. The agent determines if the identified file is the same file as the agent accessed previously, in other words, the agent determines if rotation has occurred (STEP 521). For example, on a UNIX system, the file system assigns inodes to files in the file system; when a file is changed it is given a new inode number. On a UNIX system, the agent can determine if a file has rotated by determining whether the file has the same inode number. If the file has a different inode number, rotation has occurred. On systems using other operating systems, such as WINDOWS NT™, where the file system does not use inodes, another mechanism, such as comparing creation or modification date of the current file with the previous version, must be used. For simplicity of description in the following discussion, the original file that is renamed is referred to as the first file, and the newly created empty file is referred to as the second file.

If file rotation has taken place, the agent identifies the first file (STEP 522), which was renamed. In one embodiment, this occurs by searching for all files that have the same prefix characters as the original file, and determining which of the files is the most recent, for example by comparing the inode, creation or modification date, or initial contents of the file to recorded known values of the first file. If they match, the candidate file is identified as the first file. In another embodiment, the identification occurs by searching for all files that have the same suffix characters as the original file.

Having identified the previous file (STEP 522), the agent determines whether changes (updates) to the file were made since the last transmission. If changes were made, they are identified (STEP 523). The changes optionally are processed (STEP 524) as described above, and the either processed or unprocessed changes are transmitted to the receiving agent (STEP 525). The receiving agent receives the changes (STEP 526) and may process the changes (STEP 527). The receiving agent stores the either processed or unprocessed changes (STEP 528) as described above. The receiving agent is notified about the new file name (STEP 529). In one embodiment, the notification is an instruction to rename the file so that it has the same name as the renamed file on the transmitting host. Having been notified of the name change, the receiving agent renames the file. The transmitting agent determined what changes from the first source file name were made, and the same changes are made to the first destination file name, thus renaming the destination file. Note that if it was determined (in STEP 523) that changes were not made to the previous file, no changes are transmitted (STEP 525), received (STEP 526), or stored (STEP 528), and processing continues at STEP 529. In either case, the second file is identified (STEP 530).

If rotation was detected in STEP 521, the second file is identified (STEP 530), and if rotation did not occur, the first file is identified (STEP 520). In either case, processing continues as in FIG. 4, and changes to the file are identified (STEP 531). If rotation occurred, the entire file is a "change." If rotation did not occur, then changes since the last transmission are identified. Optionally, the changes are processed (STEP 532) as described above. The (processed or unprocessed) changes are transmitted to the receiving agent (STEP 533). The receiving agent receives the changes (STEP 534), and optionally processes the changes (STEP 535) as described above. The (processed or unprocessed) changes are stored by the receiving agent (STEP 536), also as described above.

Although the method is described as steps occurring in a particular order, the order of the steps can vary, and some steps, such as the transmitting and receiving steps, may occur simultaneously. Also, while the file transfer has been described with reference to one transmitter, and one receiver it should be clear that it can be extended so that two or more transmitting agents each can communicate files to a single receiving agent using the above methods. The receiving agent thus becomes a centralized store of all the files from the transmitting agents.

Figure 7:
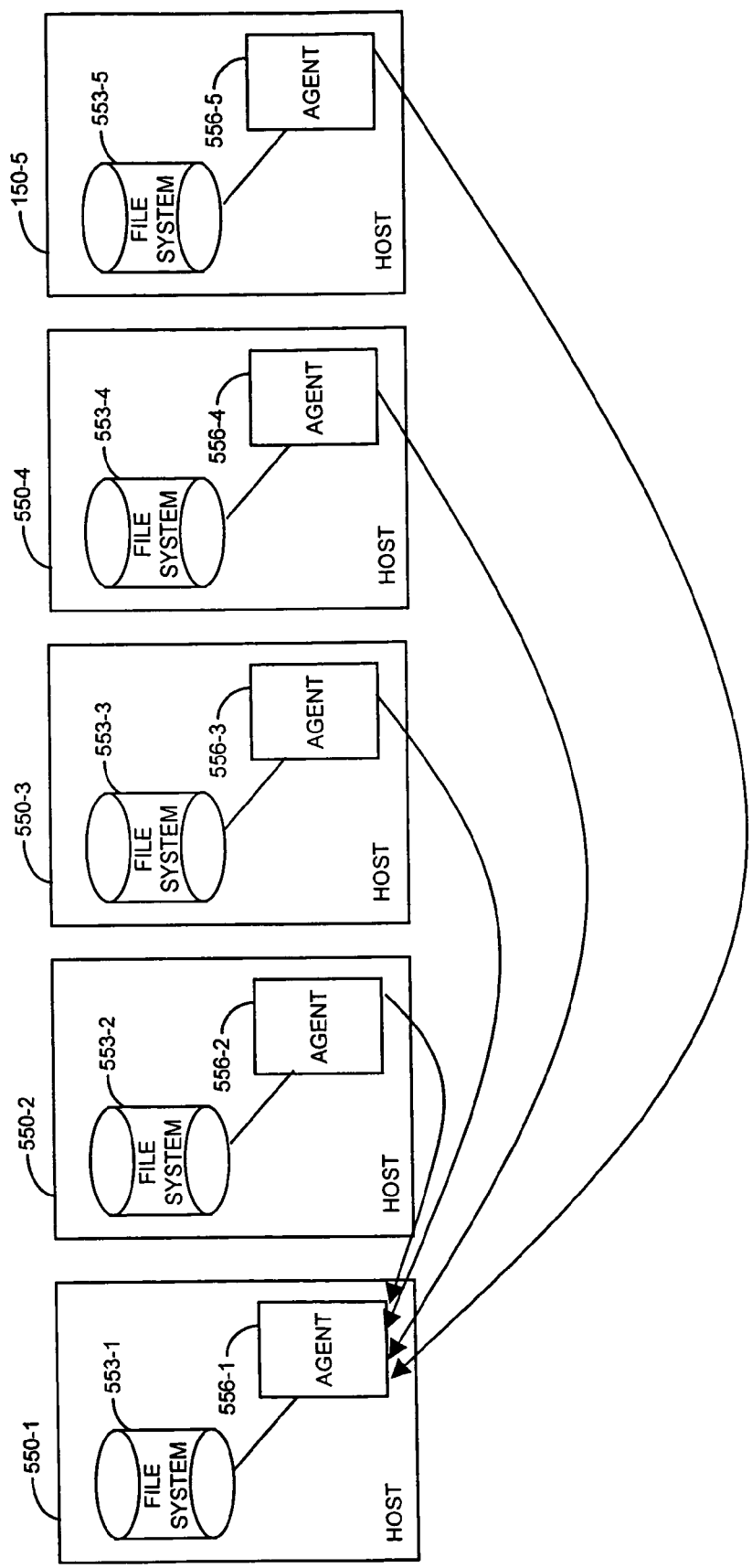
FIG. 7 is a block diagram of an embodiment of a number of hosts in a distributed system.

For example, referring to FIG. 7, in one embodiment, a number of the hosts 550-1, 550-2, 550-3, 5504, 550-5, generally 550, in a distributed system each communicate files to one host 550-1. Again, the number of hosts 550 shown in the figure is for demonstrative purposes only, and is not intended to limit the invention to any particular number of hosts. The distributed system may be the web service system of FIG. 2, or it can be another type of web service system, another type of service system (for example a file service system), or can be any system that includes multiple hosts 550. Each host 550 includes an agent 556-1, 556-2, 556-3, 556-4, 556-5, generally 556. The agents 556 can be the agents 106 as described above, which provide an interface to the web service system 90, or in other systems the agents can have other functions in addition to content collection. Alternatively, the agents 556 can be agents 556 used solely for the purpose of content collection.

Each host 550 includes a file system 553-1, 553-2, 553-3, 553-4, 553-5, generally 553. The file systems 553 are accessible by the agents 556. The file systems 553 can be implemented on media used for temporary and permanent data storage, for example a hard disk, floppy disk, removable disk, optical disk, RAM, ROM, FLASH ROM, CD-R, CD-RW, and so on. The file system is generally implemented by the operating system running on the host 550. The file system may be physically part of the host 550, or accessible to and in communication with the host 550 over a serial bus, communications network or other such link.

In the distributed system, each of the agents 556-2, 556-3, 556-4, 556-5 communicates files to one of the agents 556-1 using at least one of the methods described above. Each of the agents has content collection jobs assigned to it. When the agent is started, it determines which of the content collection jobs are to be executed and scheduled, and executes and schedules the jobs as appropriate. When a job is executed, content collection is performed using one or more of the methods of FIG. 3, FIG. 4, and FIG. 5. In the way, some subset (or all) of the files stored on the file systems 553-2, 553-3, 553-4, 553-5 are replicated on the receiving host's 550-1 file system 553-1. As described above, the transfer may involve processing, file data con-version, integration of the file data into a table or database, or other changes. The result is that the files on the hosts 550 are all collected onto a single system. The system operator then only needs to look in one place to access the files from the various hosts 550.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. In a web server system, a method of transmitting content, comprising:

establishing communication between a first web server agent and a manager, if the first web server agent is unable to establish a direct communication with a second web server agent on a remote computer;

sending a message from the first web server agent to the second web server agent via the manager, the message requesting that the second web server agent establish a communication channel to the first web server agent;

identifying, by the first web server agent, at least a portion of a file for transmission to the second web server agent; and transmitting the portion of the file from the first web server agent to the second web server agent, for storage by the second web server agent, over the communication channel.

2. The method of claim 1 wherein:

identifying comprises identifying the entirety of the file; and transmitting comprises transmitting the entirety of the file.

3. The method of claim 1, further comprising repeating the identifying, and transmitting.

4. The method of claim 1, wherein identifying comprises identifying a portion of the file that was not previously transmitted.

5. The method of claim 1 further comprising, before the identifying, the step of executing a program that operates on the file.

6. A computer readable medium storing instructions for performing a method when executed by a computer, the method comprising:

establishing communication between a first web server agent and a manager, if the first web server agent is unable to establish a direct communication with a second web server agent on a remote computer;

sending a message from the first web server agent to the second web server agent via the manager, the message requesting that the second web server agent establish a communication channel to the first web server agent;

identifying, by the first web server agent, at least a portion of a file for transmission to the second web server agent; and transmitting the portion of the file from the first web server agent to the second web server agent, for storage by the second web server agent, over the communication channel.

\* \* \* \* \*